United States Patent

[11] 3,619,573

[72] Inventors Francois Philip Saint-Mande; Jean Laporte, Avon; Jean Clerc-Renaud, la Rochette, all of France

[21] Appl. No. 818,480
[22] Filed Apr. 23, 1969
[45] Patented Nov. 9, 1971
[73] Assignee Etudes Techniques De Constructions A Fontainebleau Saint-Mande, Val de Marne, France

[54] DIRECTLY USABLE DOCUMENTS OR DRAWINGS OBTAINED BY MEANS OF COMPUTERS
17 Claims, 5 Drawing Figs.

[52] U.S. Cl. .......... 235/61.12R, 355/40
[51] Int. Cl. .......... G06k 19/06
[50] Field of Search .......... 235/61.12; 355/40

[56] References Cited

UNITED STATES PATENTS

| | | | |
|---|---|---|---|
| 3,186,111 | 6/1965 | Lawlor | 235/61.12 |
| 3,193,665 | 7/1965 | Bonnar | 235/61.12 |
| 3,202,045 | 8/1965 | Arsenault et al. | 355/40 |
| 3,259,037 | 7/1966 | Wilkinson, Jr. | 355/40 |

*Primary Examiner*—Thomas A. Robinson
*Attorney*—Wilfred G. Caldwell

ABSTRACT: A system and method of producing documents composed of tabular data developed by means of a computer and also composed of other data, such as graphic data, produced separately from the first data by manual techniques or otherwise; the system and method include the coding of standard documents bearing the graphic or other data and arranging the graphic data on the standard documents in certain predetermined locations; developing tabulations of data by means of a computer and forming tabulation documents with the data in a predetermined arrangement and keyed to the standard document by means of coding and the relative locations of the data; preselecting by means of the coding the standard document corresponding to a particular tabulation document and displaying the data of said documents in overprinting relationship, whereby, if desired, a single combined document may be produced.

DIRECTLY USABLE DOCUMENTS OR DRAWINGS OBTAINED BY MEANS OF COMPUTERS

This invention is directed to a system and method for obtaining, through the use of computers, a directly usable document on which the results of given problems are recorded.

The solutions of a number of problems have, in fact, the property of providing results of two different kinds: in one case the results are particularly well suited to rapid computation and transcription in computers and in the other case—especially results which are expressed in graphic form—are readily obtained by means of conventional methods but are very difficult and even impossible to process and transcribe by means of a computer since the time required to obtain such results is substantially longer than in the first case.

This type of problem leads to the following alternative:

either the computation and transcription of all the results relating to the problem are carried out by the computer, in which case a directly usable output document is in fact obtained; but this proves to be an extremely costly method since it occupies the computer over very long periods of time and, paradoxically, on account of information which could be obtained without difficulty by means of conventional methods;

or else the computer calculates and transcribes only results which are suited to processing in the computer and are too complex to be processed by conventional means. In this case, operations performed with a computer are much less costly but the output document is incomplete and is not directly usable.

In the second case just mentioned, some attempt may be made to make this document usable by incorporating therewith on the one hand a standard list of forms of results unprocessed by means of a computer and characteristic of the nature of the problem and, on the other hand, by calculating and transcribing on the document the identification elements which serve to refer the user to the results of the standard list. The user will then have to search in this standard list for the information which he may require, progressively as the output document is read. This method is admittedly inexpensive but is very laborious and makes the interpretation of results difficult and in some cases practically impossible, especially when the documents are intended to be used on site.

In order to permit direct and easy reading, an intermediate operation becomes necessary. Thus, skilled personnel are required to interpret the output data of the computer, to rearrange them as a function of the data which have not been processed by the computer and to incorporate these latter data. The new document which is thus obtained is then directly usable but, in the majority of cases, this intermediate operation calls for specialized personnel and substantially increases the price of the final document.

The aim of the present invention is to obtain a final document which can be directly utilized at a very low cost compared with the cost of the method hereinabove described in which the user has to search for data from a standard list progressively as the output document is being read.

The means employed for this purpose are partly constituted by a set of standard documents designated by a code in which series of data which take a long time or are impossible to transcribe by means of a computer are distributed according to a mode of classification which is characteristic of the nature of the problem being processed. In each standard document, the arrangement of the series of data makes it possible to provide locations which are left vacant and characteristic of said document and which are intended to be associated with the data derived from the computer.

Preferably, the mode of classification of the series of data in said set is arranged so as to make it possible to obtain a sufficiently small number of standard documents to ensure that the set constitutes a filing system which can readily be indexed and utilized by unskilled personnel.

The standard documents can also be printed on microfilm, especially in the case in which the nature of the problem set makes it difficult to carry out a method of classification in standard documents in a sufficiently small number.

One well suited application consists in the production of dimensioned and detailed drawings of components, structures or machines. Graphic information such as figures, diagrams and the like take a long time to transcribe by means of a computer and usually entail the need for curve recorders coupled with the computer.

The set of standard documents is in such a case made up of drawings which reproduce the range of structures of elements—or portions of elements and of their components without any consideration of scale.

Thus, by means of this method of classification, two elements having the same structure but in which the components have different dimensions correspond to the same drawing and therefore to the same code.

In the case of drawings representing structures of elements—or portions of elements—these drawings are provided with references which are intended to permit subsequent association with data derived from the computer in order to prepare final drawings.

In the application to reinforced concrete, the drawings represent structures of elements—or portions of elements—especially beams, small beams, hollow blocks, posts or foundation elements combined with the various cases of arrangements and shapes of reinforcements and comprising all the lines of dimensions, indications of bearings, return lines for longitudinal and transverse reinforcements and so forth.

The method of classification of drawings in the particular case of a reinforced concrete beam consists mainly in distributing in one series of standard drawings the structures of upper half-beams—combined with the different cases of arrangements and shapes of upper reinforcements—and in another series the structures of the lower half-beams—combined with the different cases of arrangements and shapes of lower and transverse reinforcement—in joining these two series of standard drawings which form the set of standard drawings.

These drawings can also represent structures made up of metallic construction elements and especially structural frame elements.

The arrangement referred to additionally consist of a tabulation produced in a computer of a series of data which is suited to calculation and transcription in a computer and of the code of the standard document to which said data are related. These data are written in the tabulation in locations corresponding to those left vacant in the standard document which is designated by said code. By virtue of a suitable program and by means of the input data, the computer therefore first determines the code of the standard document concerned and places the output data in the tabulation accordingly.

In the above-mentioned application to elements—or portions of elements—of structures or machines, the tabulation is constituted by the code of the drawing concerned and the specific values and indications which are necessary for use. These specific values and indications correspond to the outlines of the drawing to which they are related.

In the case of an element of reinforced concrete, the specific values and indications are: its dimensions, its characteristics, the lengths of the reinforcements, the numbers, diameter, types and locations of reinforcements as well as the useful characteristics of contiguous elements.

Finally, the arrangements are completed by programs which serve to carry out one of the tabulations described earlier.

The invention also relates to a method which consists:

in preparing a tabulation which is similar to those which have already been described;

in sorting the corresponding standard document in a set which is similar to those previously described by means of the code which is written in the tabulation;

in displaying said standard document on said tabulation by overprinting so that each datum of the tabulation should appear in the location left vacant and reserved for that purpose in the standard document;

and if necessary in combining parts of documents into a final document by virtue of a reference system.

The sorting operation can be carried out:

by hand, especially when the set of standard documents is arranged in a filing system;

or by means of an automatic device which may or may not be coupled with the computer, especially when the standard documents are printed on microfilm.

The standard document, especially on a transparent support, can appear as overprinting by being superimposed and be fixed, for example, by bonding or adhesive means.

Both standard document and tabulation can also be projected onto sensitive plates and overprinting is thus carried out by means of a photographic process.

The method of overprinting is not limited to the foregoing examples but comprises all the alternative forms which are within the reach of those versed in the art and especially methods employing printing matrices, hand drawings, special normographs and so forth.

Finally, the invention relates to a process which makes it possible to obtain a tabulation as hereinabove described from a special program as mentioned earlier.

The following description is concerned with one application to beams of reinforced concrete which will serve to gain a better understanding of the principle of the invention, reference being made to the accompanying drawings, in which.

If a mode of classification is adopted in which no consideration is given to scale or to the number of steel rods per bed, the arrangements and shapes of the upper rods taken as a whole consists in practice of approximately 160 cases corresponding to the different cases of loads and continuity. The same applies to all the arrangements and shapes of the lower steel rods. These two assemblies constitute a set which is reduced to approximately 320 drawings which are intended to be associated in pairs with the series of a "standard" filing system.

The "upper" and "lower" standard drawings of the set have the same width between supports which makes it possible to group them together in pairs and thus to cover some. Twenty-five thousand cases (160×160) in which it is possible to distribute all the shapes and arrangements of beam reinforcements without consideration either of scale or of the number of steel rods per bed.

The example chosen in the figures illustrates the case of a beam of reinforced concrete in which the computation data are as follows:

span: 5 meters
widths of supports: 0.25 meter
stringer beam
uniform load of 8,500 kgs. per linear meter
section: 0.55 m. in height and 0.30 m. in width.

Figures 1, 2:
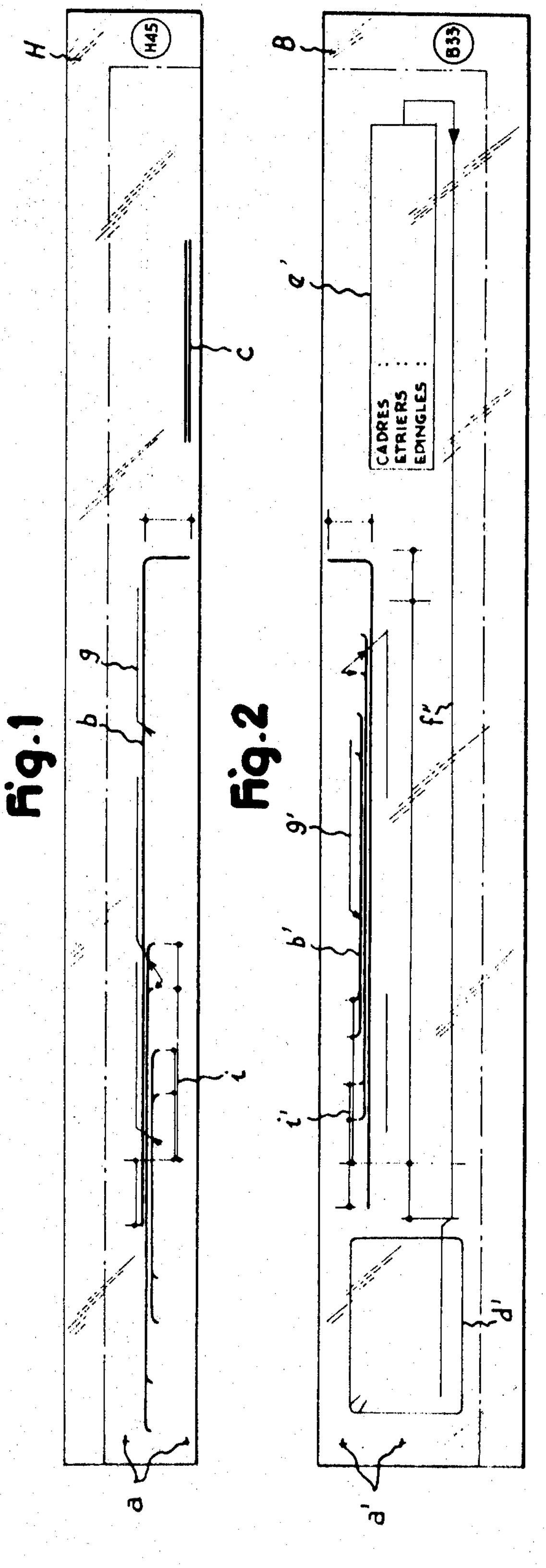
FIG. 1 is a plan view of a standard document consisting of a drawing on a transparent support and showing an upper half-beam.
FIG. 2 is a plan view of a standard document consisting of a drawing on a transparent support and showing a lower half-beam.

Referring to FIGS. 1 and 2, there can be seen strips or leaves of gummed transparent paper H and B on which are shown respectively the conventional drawings of upper and lower half-beams.

Moreover, the numerical results which can be associated with drawings H and B can be obtained by feeding the data indicated above to the computer. The transcription of these results in the form of a tabulation C which will be referred to again hereinafter can be carried out by means of a program which can be produced by a programmer to which instructions have been supplied.

A system of references—*a*—(FIG. 1),—*a'*—(FIG. 2) and—$a$—$a'_1$—(FIG. 3) is intended to permit the pairing of the drawing H and B and the superimposition of these latter on the tabulation C.

Codes H 45 (FIG. 1) and B 33 (FIG. 2) which are printed on the right-hand side on the leaves H and B identify the corresponding drawings in the "standard" filing systems. The tabulation C comprises, in the form of notation: TYPE H 45/B 33 which appears between brackets in the right-hand portion of this tabulation, the codes of the drawings H and B which the computer has determined.

Outlines *b* in the drawing H (FIG. 1) and *b'* in drawing B (FIG. 2) reproduce in elevation the shape and arrangement of the upper reinforcement beds (FIG. 1) and lower reinforcement beds (FIG. 2).

Two lines *c* in the drawing H (FIG. 1) are intended to underline after superimposition the indications of dimensions and the reference number *c''* (FIG. 3) of the beam being processed which are written in the tabulation C.

A frame (FIG. 2) in which are noted the words FRAMES, STIRRUPS, PINS is intended to be associated with the indications *e''* (FIG. 3) which define the transverse reinforcements by kinds. This frame *e'* is connected by a return line indicated by the arrow *f'* to the outline *d'* which reproduces in cross section the shape and arrangement of the transverse reinforcements of the beam concerned. Two series of numerals *f''* and *g''* (FIG. 3) which are intended to be placed on each side of the return line *f'* along *f'''* and *g'''* after superimposition (FIG. 4) define the spacing of the transverse reinforcements.

The stirrups are represented by inscriptions *h''* (FIG. 3) and the longitudinal reinforcements of the first lower bed in cross section by small circles *j''* in the tabulation C.

Dimension lines *i* in the drawing H (as shown in FIG. 1) and *i'* in drawing B (as shown in FIG. 2) provide locations for dimensions *i''* (FIG. 3) of the tabulation C.

Figure 3:
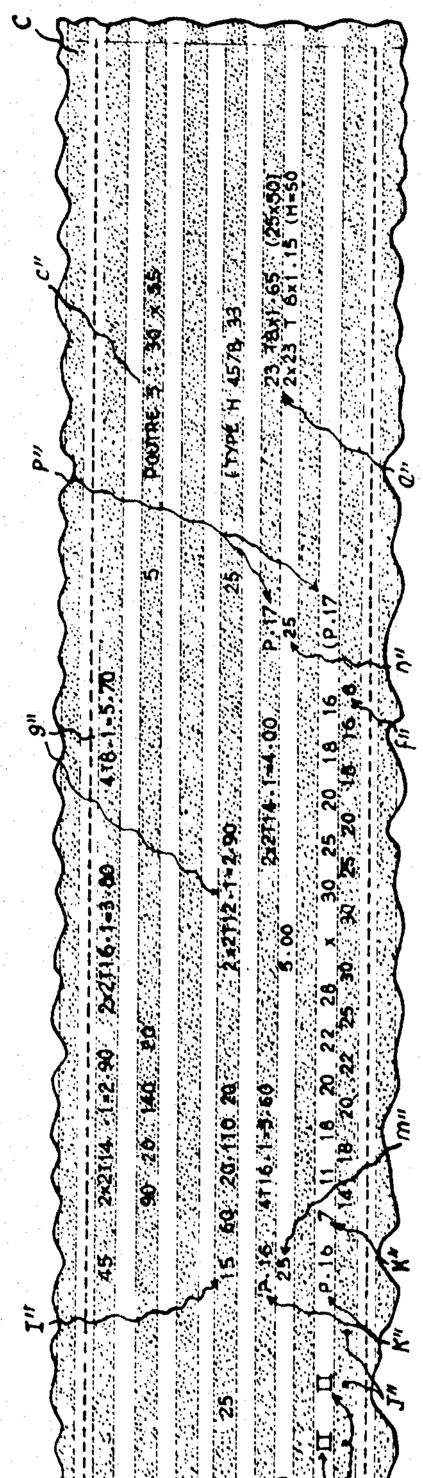
FIG. 3 is an output tabulation of a computer to which the drawings of FIGS. 1 and 2 correspond.

Return lines *g* in the drawing H (as shown in FIG. 1) and *g'* in drawing B (as shown in FIG. 2) provide locations for indications *g''* of the tabulation C (as shown in FIG. 3), namely in the order, number, grade, diameter and lengths of steels rods.

The indications *k''*, *p''* and *m''*, *n''* in tabulation C (as shown in FIG. 3) are the reference numerals of the supports and support lengths.

Figures 4, 5:
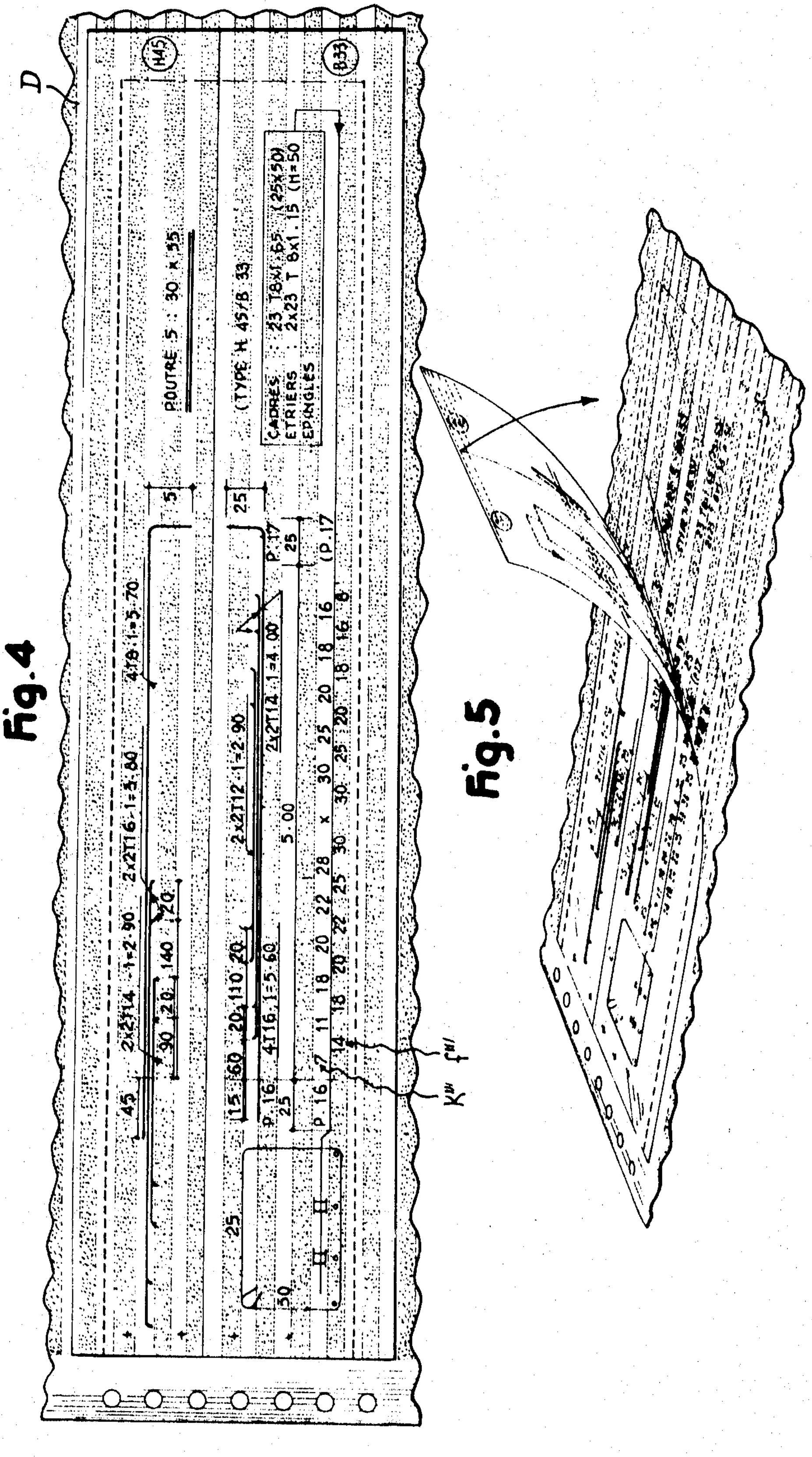
FIG. 4 represents a final drawing as is shown after the drawings of FIGS. 1 and 2 have been superimposed on the tabulation of FIG. 3.
FIG. 5 is a diagram showing the drawings of FIGS. 1 and 2 during the operation entailing superimposition on the tabulation of FIG. 3.

By virtue of special programming and the input data which relate to the beam cited by way of example, the computer determines the codes H 45 and B 33 of the drawings concerned as well as the output data previously described, then writes these results in tabulation C in an arrangement which is determined according to the code which is found. The operator then withdraws the designated drawings H and B from the standard file, superimposes them on the tabulation in the correct position by virtue of the reference system (as shown in FIG. 5) and fixes them by glueing to this latter, thereby obtaining a final drawing which can be directly utilized on site as shown in FIG. 4.

In fact, although this document is not necessarily drawn to scale, it is apparent that the distribution of dimensional values and various indications on a standard drawing makes it possible for any construction executive or foreman to read the plan which is thus constituted.

The application of the invention to beams of reinforced concrete between supports can extend to other forms. In particular, the drawings of FIGS. 1 and 2 could be devised differently, the essential condition being to ensure that the structures of the drawings can be associated with corresponding data provided by the tabulation in order to obtain a directly usable document.

For example, the invention has been described with reference to a beam of reinforced concrete; it would be equally feasible to employ leaves of the type H and B in order to permit the realization on a tabulation of plans of standard components (bolts, mechanical parts and the like).

Similarly, the leaves H and B are associated in pairs; it would also be possible in the case of more complex structures to associate a greater number; the division of the structure into "sections" makes it possible to reduce the stock of drawings which is necessary for a predetermined number of cases.

Finally, material leaves H and B have been presented and it would be possible to associate corresponding drawings with the tabulation by means of a photographic process which would involve:

distribution of drawings on negative or microfilm;

possible use of a photosensitive paper for tabulation C.

In this case, and taking into account the possibilities of storage of drawings, the "reduction" in the number of these latter as a result of cutting no longer has an essential character.

The invention is not limited to the foregoing description but extends to all alternative forms which are within the capacity of anyone skilled in the art.

What we claim is:

1. A method of obtaining through the use of a computer, a directly usable document on which the results of given problems are recorded and which results require the handling of a series of complex data suited for rapid computation and transcription by means of the computer on the one hand and a series of ordinary data, and especially graphic data which either take a long time to transcribe or are impossible to transcribe by means of the computer on the other hand, comprising the steps of:

laying out, in respect to a given type of problem, a corresponding set of standard documents designated by a code in which the series of data, which require a long time or are impossible to transcribe by means of the computer, are distributed according to a particular mode of classification which is characteristic of the type of problem, provision being made in the arrangement of the series of data in a standard document for locations which are left vacant to be associated with the data derived from the computer;

programming the computer for the problem to be processed to provide a tabulation of the series of data which is suited for computation and transcription through the use of the computer and of a datum representing the code of the standard document concerned, said data being written in the tabulation in locations corresponding to the locations which are left vacant in the standard document designated by said code:

selecting the corresponding standard document in the set of standard documents by means of the code which is common to the selected document and the tabulation;

referencing standard documents and any parts of standard documents to the tabulations producible by the computer; and, associating said selected document and any parts thereof with the corresponding tabulation to display the tabulation data in the vacant locations whereby the tabulation and said selected document and any parts thereof comprise the directly usable document.

2. A method in accordance with claim 1 wherein the laying out comprises printing on standard documents of transparent material.

3. A method in accordance with claim 2 wherein the laying out of the standard documents includes drawings selected from structures of elements and portions of elements related to the series of data written in the tabulation as to specific dimensional values and indications of the elements of structures or machines, and the directly usable documents obtained being the dimensioned and detailed drawings of said elements or portions thereof.

4. A method in accordance with claim 3 wherein the drawings representing structures of elements or of portions of elements depict reinforced concrete and especially beams combined with different cases of arrangements and shapes of reinforcements and the code of the drawings, dimensional values, and indications of the tabulation relate to elements or portions of elements of reinforced concrete and especially beams.

5. A method in accordance with claim 4 wherein the mode of classification of drawings in the case of a reinforced concrete beam consists in distributing in a series of standard drawings structures of upper half-beams combined with different cases of arrangements and shapes of upper reinforcements and in another series structures of lower half-beams combined with different cases of arrangements and shapes of lower reinforcements and transverse reinforcements whereby laying out the corresponding set of standard documents consists in the combining of these two series of standard drawings.

6. A method in accordance with claim 3 characterized in that the drawings represent structures of elements or portions of elements of metallic construction and in particular frame working elements.

7. A method in accordance with claim 1 wherein the step of associating is carried out by superimposing the corresponding standard document on the tabulation.

8. A method in accordance with claim 7 further comprising the step of fixing the standard document on the tabulation in the associated position to display the computer tabulation data in said vacant locations.

9. A set of standard documents for receiving computer output data developed for processing various types of problems comprising at least one supporting member for each document; each supporting member designated by a code; said set of documents carrying a series of data which require a long time or are impossible to transcribe by means of a computer distributed among said supporting members in accordance with a mode of classification characteristic of the type of problem to be processed; and said supporting member including vacant locations in the arrangement of the series of data for receiving data from the computer to be associated with the vacant locations.

10. A set of standard documents in accordance with claim 9 wherein said supporting members are transparent; and further comprising attaching means carried by the supporting members.

11. A set of standard documents in accordance with claim 9 wherein said supporting members comprise drawings of elements of building structures or machines graphically related to the associated data carried by the supporting member and descriptively relating to the associated drawings.

12. A set of standard drawings in accordance with claim 10 wherein said drawings comprise visible reference locations on the supporting members for use in orientating and associating the supporting members.

13. A set of standard documents in accordance with claim 11 wherein said drawings depict structures of elements or portions of elements of reinforced concrete and particularly beams combined with the various cases of arrangements and shapes of reinforcements.

14. A directly usable document partially generated by a computer comprising at least one standard document; said document comprising at least a transparent supporting member bearing coding indicia and a series of data distributed thereon leaving vacant locations in the data; a tabulation generated by the computer in accordance with the coding indicia and bearing data in locations conforming to the vacant locations when the tabulation and standard document are associated; and means for fixing the standard document to the tabulation to comprise the directly usable document bearing a completed series of data in accordance with the coding indicia.

15. The directly usable document of claim 14 wherein said standard document carries graphic information data indicative of construction elements or portions thereof to which said series of data relates.

16. The directly usable document of claim 15 wherein said standard document comprises a plurality of parts adapted to be assembled together relative to the tabulation for associating graphic portrayals to comprise a source of information relative to structural elements.

17. The directly usable document of claim 16 wherein said tabulations carry reference indicia and any parts of said standard document carry associated reference indicia for facilitating the assembly of directly usable documents.

* * * * *